June 26, 1956 — C. BARRANGO — 2,751,709
MANIKIN FRICTION JOINTS
Filed Dec. 2, 1950

INVENTOR.
CARMEN BARRANGO
BY Henry Gifford Hardy.
ATTORNEY

United States Patent Office 2,751,709
Patented June 26, 1956

2,751,709

MANIKIN FRICTION JOINTS

Carmen Barrango, San Francisco, Calif.

Application December 2, 1950, Serial No. 198,868

3 Claims. (Cl. 46—173)

This invention relates to jointed manikins for the display of garments.

Among the objects of the invention is the provision of means for detachably attaching the arms and limbs to manikin bodies.

Another object is the provision of frictional means within manikin joints for maintaining the attached arms or limbs in adjusted positions relative to the body.

A further object is the provision of a friction joint adapted for adjustably joining the parts of an articulated arm or limb, and for adjustably attaching the head to the body of a manikin.

In the present disclosure the invention is illustrated in its adaptation for joining the arm to the shoulder portion of the body with a swing range of 180 degrees of a circle.

In the specification and the accompanying drawings the invention is disclosed in its preferred form. But it is to be understood that it is not limited to this form because it may be embodied in modifications within the spirit of the invention as defined in the claims following the description.

Figure 1:
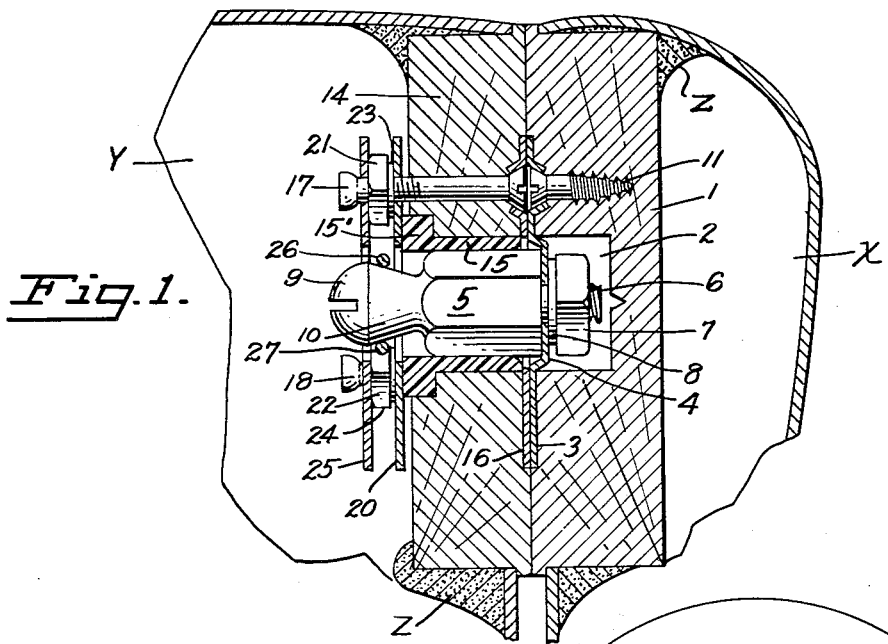
Fig. 1 is a vertical section of a manikin friction joint on the line I—I, Fig. 2, in accordance with this invention.

In detail the structure shown in Fig. 1 comprises the circular pivot base 1, preferably of wood, having the countersunk center 2. The pivot plate 3 has a hexagonal center depression 4 to receive the ends of the axial hexagonal stud 5 held therein by the bolt 6 and the nut 7 with the interposed lock-washer 8. The head 9 of the bolt provides a rounded head on the end of the stud above the tapered neck portion 10 of the stud 5. The plate 3 is attached to the base 1 by the countersunk screws 11, 12, 13.

The socket base 14, similar to the pivot base 1, surrounds the annular socket 15, forced therein and preferably composed of a compressed fiber material or plastic with a high frictional efficiency, with the outer end flange 15' of the socket projecting slightly beyond the thickness of the base 14. The socket 15 has a hexagonal hole therethrough freely slidable on the stud 5.

The socket is fixed within the base 14 by the front friction plate 16 countersunk slightly below the plane of said base, with a center opening to pass the stud 5. This front plate is fixed to the base 14 by the countersunk bolts 17, 18, 19 extending beyond the rear plane of the base and through the annular back friction plate 20 bearing against the rear flanged end 15' of the socket 15 above the rear plane of the base 14. The nuts such as 21, 22 are threaded on these bolts 17—19 and force the plates firmly against the ends of the socket 15, with the interposed lock washers such as 23, 24.

Figure 3:
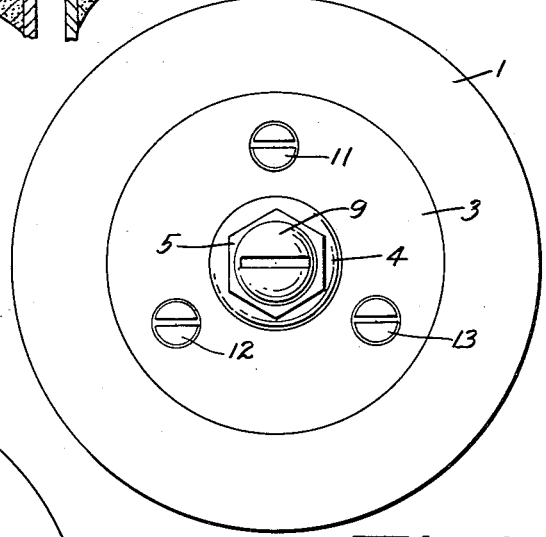
Fig. 3 is a rear elevation of the axial pivot base.
Figure 2:
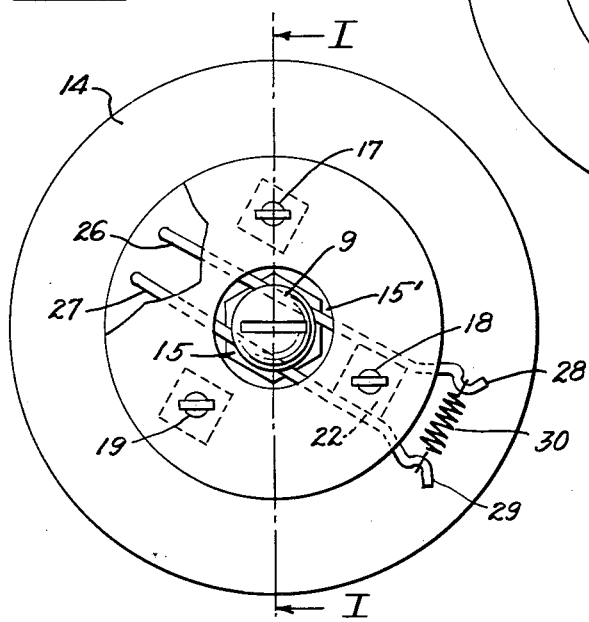
Fig. 2 is a rear elevation of the socket base with the pivot stud inserted therein.

The outer ends of the bolts 17—19 pass through the annular guard plate 25 and are flattened to force this plate against the nuts such as 21, 22, see Figs. 2 and 3. This guard plate protects the spring latch for holding the stud in the socket against longitudinal movement.

This latch comprises the parallel bars 26, 27 having bent ends extending through the block plate 20 and into the base 14 which holds them in parallel alignment across the rear opening through the socket 15. Their outer ends are spread apart and have the hooks 28, 29 to receive the end loops of the interposed contracting spring 30, normally pulling these ends toward each other. When the stud 5 is pushed through the socket 15 the rounded head 9 forces the bars 26, 27 apart until they contract against the tapered neck 10 of the stud against which they are forced by the contraction of the spring 30. The tapered neck between the latch bars functions as a cam to pull the opposed faces of the pivot base and the socket base together to give added frictional area against rotation of the stud and socket assemblies.

The pivot base 1 and the socket base 14 are fixed in the arm X and the body Y respectively, by cementing with plaster of Paris Z in the usual manner.

This invention operates substantially as follows: The operator steadies the manikin body Y with one hand and grasps the arm X in the other and thrusts the stud 5 into the socket 15 until the round head 9 pries the latch bars 26, 27 apart and they contract on the tapered neck 10 to retain the arm in operative position, as in Figs. 1 and 2.

When the arm X is raised or lowered the hexagonal stud rotates the hexagonal socket against the frictional pressure exerted against the ends of the socket by the plates 16, 20, drawn together by the bolts 17—19. A particular advantage of the present structure is that the arm will stay in any adjusted position, and may be swung around a complete circle without disengaging from the socket mounting.

The arms may be removed from the manikin body by pulling the studs out of the sockets against the resistance of the spring latch, for convenience in manipulation and storage of the manikin.

Having fully described this invention and its mode of operation what I claim and desire to secure by Letters Patent is:

1. A readily attachable and detachable manikin friction joint for adjustably securing limbs to the body comprising a pivot base fixed in said limbs having a hexagonal stud with a rounded head and an inwardly tapered neck and projecting from said pivot base; a socket base fixed in the body of said manikin having a central opening therethrough; a frictional socket rotatable within the opening through said socket base and projecting therefrom and having a hexagonal opening slidably engaging said stud; opposed front and back friction plates bearing against the opposite ends of said socket respectively and bolted together through said socket base; and a spring latch mounted upon said socket base and engaging said tapered neck for releasably latching said stud within said socket, said release being attained by an axial outward force against the resistance of said spring latch.

2. A readily attachable and releasable manikin friction joint for adjustably mounting limb members on a body comprising a pivot base secured in said member; a pivot plate fixed to the face of said base and having an hexagonal stud with a rounded head and an inwardly tapered neck fixed to and projecting from said plate; a socket base secured in said body having a central opening therethrough; a frictional socket rotatable within the opening through said socket base and with a flanged end projecting therefrom and having an hexagonal passage therethrough slidably engaging said stud; opposed front and back friction plates bearing against the opposite ends of said socket respectively and bolted together through said socket base; and a spring latch mounted upon said socket base and releasably engaging said tapered neck while permitting rotation of said stud, said release being accomplished by pulling said stud against the resistance of said spring latch.

3. A readily attachable and detachable manikin friction joint for adjustably mounting limb members on a body comprising a pivot base secured in said member; a pivot plate fixed to said pivot base; a hexagonal stud projecting from said pivot plate and having an inwardly tapered neck; a threaded portion at the opposite end of said stud passing through said pivot plate and having a nut thereon behind said pivot plate for securing said stud thereto; a socket base secured in said body having a rotary frictional socket therein with a flanged end projecting therefrom and an hexagonal passage therethrough slidably engaging said stud; opposed front and back friction plates bearing against the opposite ends of said socket respectively and bolted together with draw bolts through said socket base; parallel latch bars mounted on the inner face of said socket base and engaging the opposite sides of said tapered neck and drawn against said neck by a spring interposed between the outer ends of said bars for releasably latching said stud within said socket while permitting rotation thereof; and a guard plate overlying said latch bars and mounted upon the projecting ends of said draw bolts.

References Cited in the file of this patent

UNITED STATES PATENTS

| | | |
|---|---|---|
| 387,444 | Poulson | Aug. 7, 1888 |
| 1,077,560 | Ryan | Nov. 4, 1913 |
| 2,194,460 | Heimann | Mar. 26, 1940 |
| 2,316,732 | Weinstein | Apr. 13, 1943 |
| 2,409,068 | Roethel | Oct. 8, 1946 |
| 2,451,023 | Dusko | Oct. 12, 1948 |
| 2,535,116 | Beebe | Dec. 26, 1950 |

FOREIGN PATENTS

| | | |
|---|---|---|
| 20,601 | Great Britain | 1914 |
| 474,250 | Germany | Apr. 5, 1927 |
| 329,016 | Great Britain | May 9, 1930 |